United States Patent
Futch, Jr. et al.

[15] 3,657,542
[45] Apr. 18, 1972

[54] PRODUCTION OF BEAMS OF EXCITED ENERGETIC NEUTRAL PARTICLES

[72] Inventors: Archer H. Futch, Jr., Livermore, Calif.; Robert H. McFarland, Rolla, Mo.

[73] Assignee: The United States of America as represented by the United States Atomic Energy Commission

[22] Filed: May 4, 1970

[21] Appl. No.: 34,282

[52] U.S. Cl. .......................................... 250/84, 250/41.3
[51] Int. Cl. .................................................... H01j 37/00
[58] Field of Search ................ 250/43, 41.3, 41.9 SE, 84; 313/63

[56] References Cited

UNITED STATES PATENTS 3,424,904   1/1969   Donnally .............................. 250/84
3,136,908   6/1964   Weinman .............................. 313/63

*Primary Examiner*—William F. Lindquist
*Attorney*—Roland A. Anderson

[57] ABSTRACT

Excited energetic neutral particle beams are produced, in accordance with one method, by directing a low energy ion beam through a gaseous medium under thick target conditions. In accordance with a second method, the low energy ions, i.e., below 10 KeV, are directed through a first selected gaseous medium at which resonance or near resonance charge exchange neutralization occurs and the neutral particles are then passed through a second gaseous medium in which the particles are excited to high $n$-quantum levels. In either case the excited state neutral particle can then be more easily ionized by the Lorentz force when they are introduced into a magnetic containment field to form a plasma therein. The second gaseous medium generally comprises a different gas than the first and is especially selected to produce the maximum portion of excited states.

4 Claims, 4 Drawing Figures

INVENTORS.
Robert H. McFarland
Archer H. Futch, Jr.
BY

ATTORNEY.

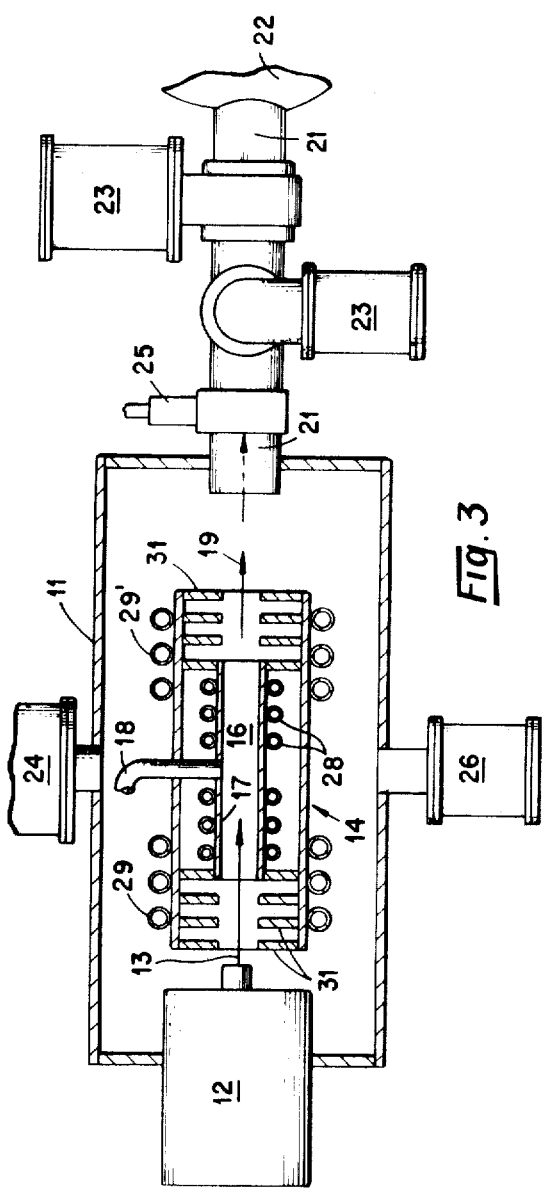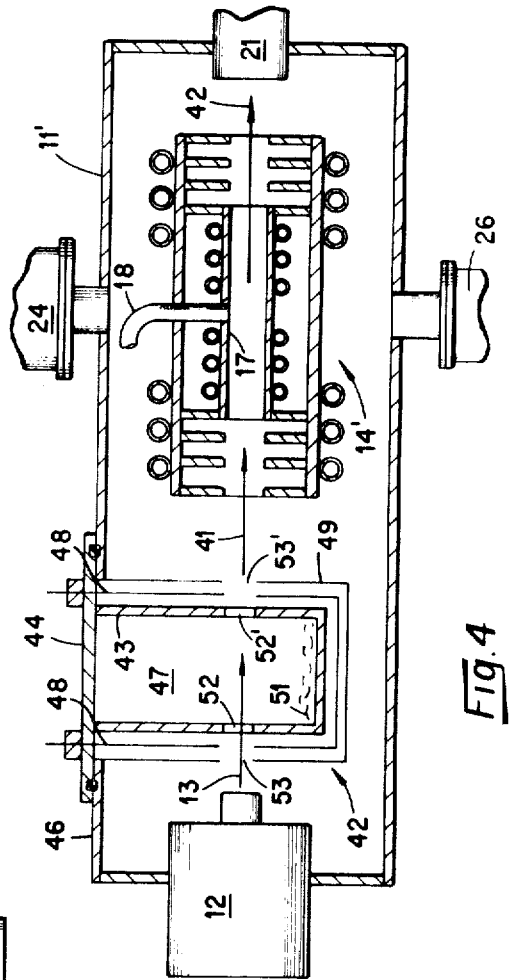

PRODUCTION OF BEAMS OF EXCITED ENERGETIC NEUTRAL PARTICLES

BACKGROUND OF THE INVENTION

The invention described herein was conceived or made under Contract W-7405-Eng-48 with the United States Atomic Energy Commission.

Energetic neutral atomic or molecular particles are employed in a variety of instruments or accelerators and especially in the production of high temperature gases or plasmas such as those employed in controlled fusion or thermonuclear devices and reactors. In the latter instance, in accord with conventional practice, an energetic neutral particle beam may be produced by directing a beam of relatively high energy ions through a region containing a gaseous or vaporous target medium wherein the ions are neutralized by undergoing a charge exchange reaction with neutral atoms or molecules. A fraction of the emerging neutral particles are in highly excited quantum levels. The energetic neutral particles may then be directed into a magnetic containment field of appropriate configuration such as a magnetic mirror type field used in a controlled fusion reactor. These neutral particles can penetrate external portions of the magnetic field to enter the magnetic containment zone where the Lorentz field, $\vec{v} \times \vec{B}$, equivalent to a specific electric field $\vec{E}$, is sufficient to ionize the highly excited levels. The charged particles formed by ionization or dissociation are trapped in the containment zone to form a plasma. In this manner the density of the plasma may be increased to a desired operating level. If the excited quantum state is too high, these particles may be dissociated and lost in external portions of the field and if too low the particles will pass through the system before ionization or dissociation occurs. Other dissociation mechanisms such as collisions of unexcited energetic neutral particles with residual gas atoms and molecules or with cold plasma are generally of subsidiary importance at least in the initial phases of plasma density buildup. This procedure has been widely used for injecting and trapping light nuclide ions, e.g., hydrogen isotopes in controlled fusion devices.

A typical controlled fusion device utilizing such a procedure is the "ALICE" device described, inter alia, in Section 9.179, "Controlled Thermonuclear Reactions", Glasstone and Lovberg, Van Nostrand Co., Inc. 1960 pages 55-59; "Plasma Physics and Thermonuclear Research", Series XI, Progress in Nuclear Energy Pergammon Press, 1963. The magnetic field configuration utilized in the foregoing devices is a steady magnetic mirror field, i.e., an axial magnetic field having regions of increased intensity at each end. Such a magnetic mirror field is a potential well in which charged particles are contained. A modification thereof in which longitudinal conductors, i.e., Ioffe bars, are placed radially about said magnetic field region produces a minimum B magnetic field which is stable with respect to hydromagnetic instabilities. Similar minimum B magnetic field configurations are produced by the so-called tennis ball or baseball seam magnetic field coils, c.f., "A Tennis Ball Seam Coil for Plasma Physics Research", "Proceedings of the Second International Conference on Magnet Technology", Oxford, England, July 10-13, 1967. A baseball seam magnet for producing variable magnet fields is disclosed in the copending application of Carl D. Henning and Anthony K. Chargin, Ser. No. 753,189, filed Aug. 16, 1968 issued as U.S. Pat. No. 3,491,318 on June 20, 1970. Devices utilizing conventional conductors as well as super conductor magnetic field coils have been designed for producing the containment fields.

The interaction of a beam of energetic ions with atoms or molecules of a vapor or gaseous medium involves three fundamental process, i.e., production of neutral particles by charge exchange, scattering which results in losses from the beam, and excitation, or de-excitation of energetic neutral particles involving electrons in quantum states above the ground level, generally termed an excited state.

Heretofore, perhaps based on prior experience with high energy ions, i.e., above 10 KeV and particularly, at 20 KeV and above, conditions providing resonance or near resonance charge exchange of ions into the ground level have been avoided. It has generally been considered that relatively low yields of excited neutral particles would be obtained using a target medium providing resonance or near resonance charge exchange into the ground level.

Accordingly, in the prior art, the neutralizing medium has been selected such that charge exchange of ions into the high excited levels was a resonance or near resonance process. As the target thickness of such a neutralizer is increased, the fraction of the ion beam which is neutralized increases; however multiple collisions were observed to decrease the fraction of neutral particles which are in highly excited levels. Therefore, a compromise target thickness was chosen to obtain an optimum number of excited states with respect to the incident ion beam.

The charge exchange reaction yields energetic neutral particles which are populated in their higher excited quantum states with a principal quantum number dependence proportional to $n^{-3}$. Furthermore, for a specific electric field $\vec{E}$ or an equivalent Lorentz field $\vec{v} \times \vec{B}$ it has been shown that the fraction of neutral particles which are field ionized is proportional to $E^{1/2}$.

From the n dependence of the excited state population it has been shown that for thin targets the ratio of the ions produced by the electric field to the total neutrals is proportional to the square root of the ionizing field: That is $$\int_{n}^{\infty} R(n')dn' = \frac{\text{Neutrals field ionized by } E}{\text{Total neutrals in beam}}$$

$$= 6.4 \times 10^{-4} a_o E^{1/2}$$

if $$R(n) = \frac{\sigma_n{}^c}{\sum_{n'} \sigma_{n'}{}^c} = \frac{a_o}{n^3}$$

and the ionizing field, $\vec{E}$, is proportional to $n^{-4}$ where $\sigma_n{}^c$ is the probability of a charge exchange interation leaving the neutral atom in the nth excited state. It has been found experimentally for thick targets that $R(n)$ is also proportional to $n^{-3}$. Therefore, one may define $a$ as the corresponding proportionality constant for thick targets.

Target thicknesses may be expressed in terms of the gas pressure in microns (Hg) multiplied by the distance in centimeters traversed by the ion beam, i.e., in the dimension of micron-centimeters. Target thicknesses necessary to obtain equilibrium or thick target conditions are dependent on the energy of the initial ions.

SUMMARY OF THE INVENTION

The present invention relates generally to the production of beams of energetic neutral particles and, more particularly, to methods and apparatus for more efficiently producing beams of low energy neutral particles in excited levels.

It has now been discovered that the excited state populations of neutral atoms beams produced by charge exchange in a gas or vapor are enhanced at low energies (below about 10 KeV) by passage of the neutrals through a thick target. In providing resonance charge exchange conditions, it is an essential requirement that the atomic or molecular particles of the target medium possesses one or more quantum states which is closely equivalent or similar to those of the energetic neutral atom or molecule formed by charge exchange. This requirement is most easily satisfied by selecting a medium comprising similar atoms or corresponding molecular species. For example, with $H^+$, $D^+$ or $T^+$ ions, hydrogen gas may be used. A second requirement necessary to enhance the excited state populations is that the excitation rate predominates over the rate of loss of excitation for the selected charge exchange medium. This latter condition does not appear to have been found possible to satisfy heretofore using higher energy ions. However, it has now been found that the condition can be satisfied with low energy ions so as to make possible the more efficient production of beams of excited low energy neutral particles using certain procedure set forth hereinafter. Moreover, it has been found that the enhanced excitation effect persists to thick target conditions so that a high proportion of excited neutral particles can be produced.

Based on the foregoing discovery in accordance with one embodiment of the invention, a beam of low energy ions, i.e., below about 10 KeV, particularly ions of the hydrogen isotopes protium (P), deuterium (D), and tritium (T), are directed through a region containing a selected gaseous or vaporous resonance charge exchange medium under so-called "thick target" conditions to produce a beam of excited low energy neutral particles. In a second embodiment of the invention, low energy ions are passed through a first region containing a selected first gaseous neutralizing medium under resonance conditions and then through a second region containing a different gaseous medium having characteristics which more effectively enhance the populations of the excited levels in the beam by collisional excitation. Thence forth, the excited neutral beam may be directed into a magnetic field containment zone, e.g., of a controlled fusion reactor, wherein the particles dissociate in the Lorentz force field therein, to form a plasma.

Apparatus for producing the beam generally includes an evacuated housing containing an ion source. In the case of the single-medium procedure described above, a collimated ion beam is directed from the ion source through a neutralizer cell which interposes a selected gaseous medium, e.g., hydrogen operated under selected "thick target" conditions to interact with the ions and yield a beam of excited neutral particles. In the second case the collimated ion beam is directed through a neutralizer which interposes a selected gaseous medium under conditions most effective for conversion of the ions into neutral particles. The neutral particle beam therefrom is then directed through an exciter which interposes a second medium operating under conditions which enhance the populations of excited levels in the beam by collisional excitation with the medium.

Accordingly it is an object of the invention to provide apparatus and methods for producing low energy excited neutral particles for use in establishing plasmas in magnetically defined containment zones which objective may be accomplished either by passing a charged particle beam through a vaporous medium which accomplishes both neutralization and excitation or by passing a beam through a gaseous medium first to effect neutralization and thenceforth through a second vaporous medium to enhance the population of excited levels in the neutral beam.

Other objects and advantageous features of the invention will be apparent in the following description taken in conjunction with the accompanying drawings, of which:

Figure 1:
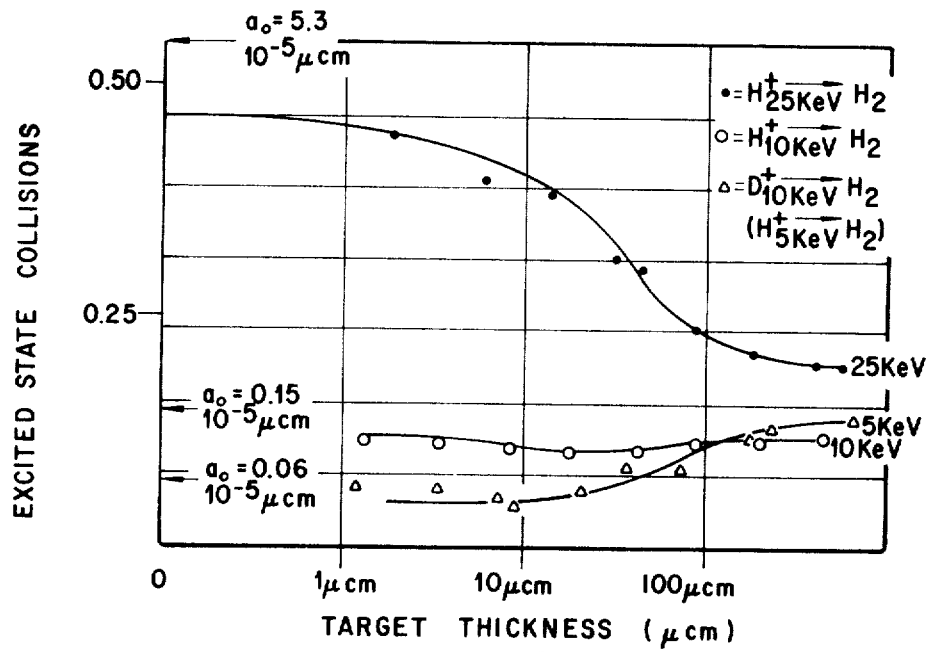
FIG. 1 is a graphical illustration of the variation in excited energetic neutral particle production from hydrogen and deuterium ions of varying energy interacting with a resonant hydrogen charge exchange neutralizing and excitation medium of varying target thicknesses.

FIG. 3 is a longitudinal sectional view of a first apparatus embodiment, utilizing a single thick target medium for providing energetic neutral particles in excited levels; and FIG. 4 is a longitudinal sectional view of a second apparatus utilizing a first gaseous target medium for neutralizing energetic charged particles and a second gaseous medium for exciting the energetic neutrals by collisional processes.

Procedures for measuring excited state populations by the use of electric field ionization has been reported by many authors, see for example "Enhancement of the Excited-State Population in a Hydrogen Atom Beam" A. H. Futch et al., *Nuclear Fusion*, 3, 124 (1963) and references cited therein. For the present purpose results of certain determinations are expressed in terms of the thin target excitation coefficient, $a_o$, the excitation coefficient for thick targets, $a$, and $R(11)$ or $R(14)$ which are, $a_o$, or $a$, divided by $(11)^3$ and $(14)^3$ respectively. Results of measurements of, $a$, obtained in the course of directing H$^+$ at 25, 10 and 5 KeV energies and D$^+$ at a 10 KeV energy through an H$_2$ charge exchange medium, are graphically illustrated in FIG. 1 of the drawing. With respect to atomic collisions, D$^+$ at 10 KeV energy is equivalent to H$^+$ at 5 KeV. The 25 KeV values are typical of those known heretofore and show the highly effective production of excited neutral particles using thin targets wherein single collisions predominate as well as the dramatic decrease in production as the target thickness is increased. This decrease is generally attributed to depopulation of the excited energy states by the multiple collisions which occur in the thick targets. At 10 KeV it may be observed that excited state neutral production remains substantially constant over the range of thin to thick targets. However, it may be noted that with 5 KeV H$^+$ ions as well as for the equivalent 10 KeV D$^+$ ions, excited state neutral production is at a relatively low level for thin targets, but increases quite steadily as target thickness is increased up to an optimal thickness.

Figure 2:
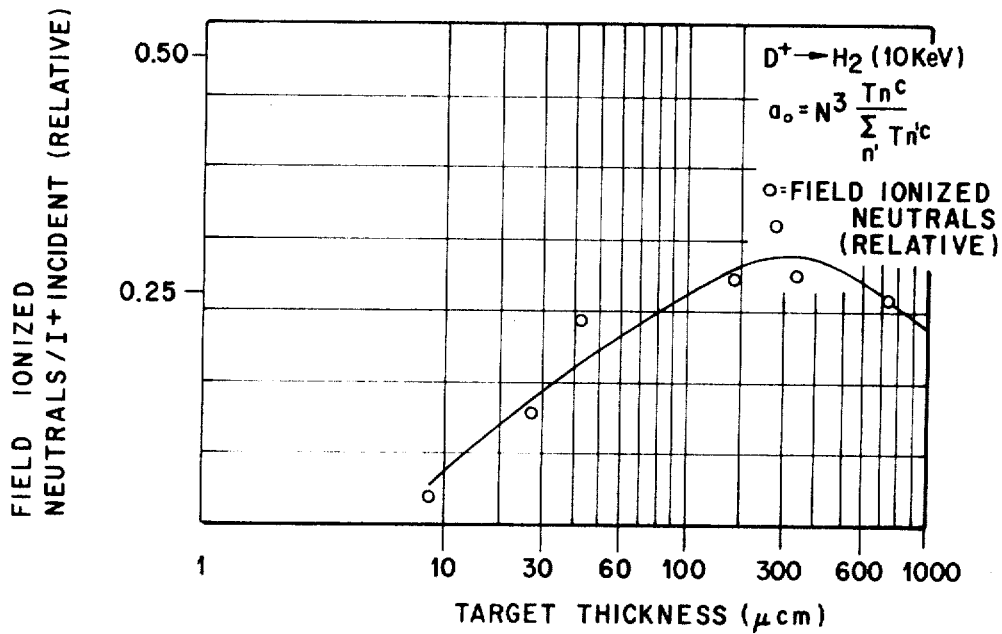
FIG. 2 is a graphical plot of the ratio of field ionized neutrals to the incident ion beam, I$^+$, at varying target thickness, for the interaction of 10 KeV D$^+$ with H$_2$.

The results of a further study of the proportion of excited 10 KeV neutral deuterium atoms interacting with H$_2$ gas under varied target thickness conditions are illustrated in FIG. 2 of the drawing. It will be observed, that with incident 10 KeV, D$^+$, (5 KeV, H$^+$), 300 micron-cm, approximates an optimal target thickness and that the rate of change, e.g., between about 80 micron-cm and 500 micron-cm, is relatively low. The foregoing values may therefore be taken to indicate the limits of the practical operating range. Characteristic operating curves such as the foregoing may be used to select the conditions to be used in the apparatus described hereinafter. For the optimal value of target thickness, i.e., 200 micron-cm, one might use a gas cell of about 100 cm length operating at 2 microns H$_2$ or D$_2$ pressure. Various other combinations of cell length and gas pressure giving comparable target thicknesses may be selected. Results of measurement made with a variety of other media and at various ion energies for H$^+$ are given in Table I.

TABLE 1.—COMPILATION OF MEASUREMENTS OF THIN AND THICK TARGET EXCITATION COEFFICIENTS

[Numbers in parentheses are target thicknesses for maximal excited neutral production in micron-cm.]

| | Energy, kev. | | | | | | | | | | | | | | | | | | |
|---|---|---|---|---|---|---|---|---|---|---|---|---|---|---|---|---|---|---|---|
| | 4 | | 5 | | 6 | | 7.5 | | 10 | | 12.5 | | 15 | | 20 | | 25 | | 30 |
| Molecule | $a_o$ | a | $a_o$ | a | $a_o$ | a | $a_o$ | a | $a_o$ | a | $a_o$ | a | $a_o$ | a | $a_o$ | a | $a_o$ | a | $a_o$ | a |
| H$_2$ | | | | | | .89 | | 1.4 | | 2.7 | | 4.3 | | 4.4 | | 3.7 | | 2.7 | | 1.6 |
| K | | | | | | 1.6 | | 3.5 | | 5.1 | | 6.3 | | 6.3 | | 3.6 | | 1.8 | | 1.1 |
| Mg | | | | | | .4 | | .6 | | 1.3 | | 2 | | 2.6 | | 3.7 | | 4.3 | | 4.7 |
| Ti | | | | | | .72 | | .84 | | 1 | | 1.3 | | 1.5 | | 1.7 | | 2 | | 2.1 |
| H$_2$ | | | .06 | (200).12 | | | | | .15 | | .11 | | .28 | | .45 | .27 | .53 | .2 | .64 |
| N$_2$ | | | 0.1 | (270).19 | | | | | .16 | (50).3 | | | .23 | | .46 | | .51 | | .60 |
| C$_3$F$_{16}$ | 1.0 | (150).35 | .8 | (140).35 | .41 | | .38 | | .36 | | .38 | (80).31 | .41 | (70).33 | .55 | (50).35 | >.6 | (40).33 | | |
| Freon 114 | | | | | | .27 | | .31 | | .47 | | .57 | | .68 | | .80 | | .93 | | 1.0 |
| H$_2$O | | | .08 | (60).13 | | | | | | | | | | | | | | | | |
| NH$_3$ | | | 0.1 | (380).15 | | | | | | | | | | | | | | | | |

Target thickness corresponding to thick targets are listed enclosed in parenthesis above the , $a$ , values in the thick target coefficient, $a$, column therein. Thin target, $a_o$, coefficients are also listed.

Comparison of additional data similar to FIG. 1 and 2 for the production of field ionized neutrals (for the same ion current) at 5 KeV equivalent energy shows $H_2$ to be the best medium, of those listed, for producing excited state low-energy neutral hydrogen particles. Relative to $H_2$, neutralizing media composed of $N_2$, $NH_3$, $C_8F_{16}$ and $H_2O$ appear effective by the factors 0.32, 0.18, 0.17, and 0.14, respectively, at optimal neutralizer thickness as employed in the single medium embodiment described above. These ratios reflect charge exchange and scattering cross sections in addition to the "$a$" value. These results at low ion energies are categorically different from those expected from prior experience and represent a marked increase as a class thereover although the individual materials vary within the class.

In the second embodiment of the invention, a hydrogen, magnesium, or similar target having a thickness in the range of about 50–150 micron-cm with an optimum value of about 100 micron-cm may be used in the first neutralizer unit. In the second neutralizer unit per fluoro dimethylcyclohexane ($C_8F_{16}$), $H_2O$, $H_2$, $NH_3$, or nitrogen gas ($N_2$) with a target thickness in the range of about 50 to 300 micron-cm may be used.

Apparatus for producing a beam of low energy excited neutral particles utilizing a single thick target medium in accordance with the first embodiment of the invention, is illustrated in FIG. 3. Such apparatus may comprise an elongated hermetically sealed enclosure 11, having an ion source 12 mounted to direct a beam 13, of low energy ions, i.e., $H^+$, $D^+$ or $T^+$ in the range of about 1 KeV to 10 KeV and particularly in the range of about 2 KeV to about 8 KeV longitudinally along the enclosure. The ion source 12 may be of any conventional design which produces a well collimated beam of low energy ions, e.g., the well-known Duo-Plasmatron type described in the "Plasma Physics and Thermonuclear Research" reference cited above. A gas neutralizer unit 14 is positioned such that channel 16 is in coaxial alignment with the ion beam 13. A gas may be admitted to the central tubular member 17 defining a portion of channel 16 in unity from a conduit 18 leading to a controlled flow gas supply (not shown) exterior to housing 11. In a neutralizer of this type a gas or vapor is chosen such that charge exchange of ions into highly excited levels is a resonance or near resonance process. The target thickness is then determined by the requirement that the excited state population be a maximum. With 5 KeV, H, D or T, particles the optimal target thickness for $H_2$ or $D_2$ in the range of about 80 micron-cm to about 500 micron-cm.

In the neutralizer channel 16 the low energy ions undergo multiple collisions with the neutral atoms or molecules of the target medium first to undergo a charge exchange reaction producing neutral particles which then are excited to higher quantum states which emerge in an essentially collimated beam 19 of excited neutral particles. Using $D^+$ ions and $H_2$ gas as an example, the overall reaction may be illustrated as follows:

$$D^+ + H_2 \rightarrow D^* + H_2^+$$

The excited neutral particle beam 19 is directed through a beam tube 21 into the vacuum vessel 22 of a controlled fusion reactor or other high temperature plasma device of the conventional character described above, to be ionized and trapped to form a plasma in the magnetic field containment zone thereof as in conventional practice.

The beam tube 21 may include a valve 22 for closing off the vacuum vessel during servicing and maintenance operations. One or more vacuum pumps 23 may be coupled thereto to remove any neutral gas or other contaminant escaping from enclosure 11. The beam tube 21 may also include a baffled inner wall surface which, with coolant coils, (not shown) serve to condense and trap materials such as target media escaping from enclosure 11, thereby preventing the introduction of undesired contaminants into vessel 22, in a manner well known in the art. A beam tube constructed in this manner may comprise a differential pumping arrangement of the character disclosed on page 57, of said "Plasma Physics and Thermonuclear Research" reference cited above. Enclosure 11 may be provided with one or more vacuum pumps, for example, a diffusion pump 24 and/or a high capacity gettering pump 26 or other equivalent high capacity vacuum pumps (not shown). In usual practice, enclosure 11 and beam tube 21 are evacuated to below about $10^{-6}$ mm Hg. Vessel 22 is preferably evacuated to below about $10^{-8}$ to $10^{-10}$ mm Hg. in accord with conventional controlled fusion reactor practice utilizing additional vacuum pumps (not shown). In the event a condensible vaporous medium is employed in such a unit 14, a temperature regulated heat transfer medium may be circulated through tubing coils 28 wound about tubular member 17 to maintain the vapor at an appropriate temperature level. Likewise, a cryogenic coolant, e.g., liquid nitrogen or other appropriate coolant may be circulated through coils 29, 29' disposed about the ends of unit 14 if needed to cool baffles 31 defining the ends of channel 16 to condense and minimize escape of medium from unit 14. The rate of flow of said medium from conduit 18 may be regulated to establish the desired pressure in channel 16. The pressure of the medium in the channel measured in microns (Hg) multiplied by the length of channel 16 yields the target thickness of the medium therein.

For operating in accord with the second embodiment of the invention, the apparatus of FIG. 3 is modified to include an additional neutralizer unit which is interposed within enclosure 11 between the source 12 and neutralizer unit 14. In this instance the gas or vapor in the additional unit is chosen so that charge exchange into the ground level, i.e., charge exchange neutralization, occurs as a resonance process resulting in a maximum preparation of neutral particles in the beam which emerges therefrom. The unit 14', otherwise similar to unit 14 now, however, is supplied through conduit 18 with a gaseous or vaporous medium of such a nature especially selected to provide optimal excitation and minimum loss of particles from beam 41 passing therethrough. The excited state energetic neutral particle beam 42 emergent from unit 14' is then directed through beam tube 21 as with neutral particle beam 19 described above. Since neutralization and excitation can each be optimized, with this dual tandem neutralizer arrangement, more efficient production of an excited state particle beam can be realized.

The additional unit may be similar in construction to units 14 or 14' when a gaseous medium such as hydrogen is employed therein. However, highly efficient neutralization may also be obtained using a vaporous material such as magnesium vapor which requires a neutralizer unit 42 capable of operation at an elevated temperature such as that indicated in FIG. 4, in order to obtain an adequate vapor pressure. More particularly the enclosure 11' is elongated to accommodate unit 42 which comprises a closed vessel portion 43 suspended from a cover plate 44 secured in sealed relation to the periphery of an opening in the upper wall 46 of enclosure 11' and defines a chamber 47 therein. Electrical heating elements 48 and a heat shield 49 are arranged in proximity to the sidewalls and bottom of vessel portion 43 to provide heat for vaporizing a material, such as magnesium chips 51, heated to a temperature in the range of about 300° to 500° C., to provide the neutralizer medium target thickness in chamber 47. Openings 52, 52' are provided in the sidewalls of vessel portion 43 aligned with openings 53, 53' in shield 49 to allow passage of ion beam 13 through chamber 47 to interact with said magnesium vapor and emerge as neutral beam 41 which then passes through unit 14' as described above. It will be appreciated that a gaseous medium introduced in any suitable manner may also be employed in such a unit 42.

The reaction in chamber 47 may be represented by the equation:

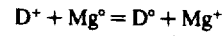
$$D^+ + Mg^\circ = D^\circ + Mg^+$$

with hydrogen in such a chamber or other additional neutralizer, mentioned above, the reaction is $$D^+ + H_2^\circ = D^\circ + H_2^+$$

The low energy neutral particles, e.g., $D^\circ$, on undergoing multiple collisions during passage through the thick target medium, in unit 14' are raised to an excited energy level, i.e., the electrons are raised to higher quantum levels short of ionization. The interaction may be represented by the following equation:

$$D^\circ + Mg = D^* + Mg$$

In summary in operating the foregoing apparatus, a collimated beam 13 of low energy ions, for example, in the range of about 800 eV to about 10 KeV, is directed through the neutralizer unit 42 which contains a vaporous or gaseous neutralizing medium. A medium may be used therein which provides resonant or near resonance charge exchange interaction so that maximal neutralization is achieved without a compromise which might be required if optimal excitation was concurrently desired. These conditions are such that a major proportion of the ions undergo a single collision effective to produce neutralization by charge exchange while a minor proportion undergo multiple collisions which would cause excessive scattering from the beam so that a high proportion of the injected ions emerge as neutral particles in the collimated beam 41. Now when the collimated beam 41 of energetic neutral particles passes through unit 14', the particles undergo multiple collisions with the target vapor medium therein under conditions such that a maximal proportion are excited so that the electrons thereof are raised to higher, more easily ionizable or dissociable quantum levels. The excited neutral particle beam 42, emerging from unit 14' may accordingly be directed through the beam tube 21 into the magnetic containment zone (not shown) in reactor vessel 22. The excited neutral particles are ionized initially, at least, by Lorentz fields as mentioned above, to initiate the formation of a plasma, e.g., a thermonuclear plasma containing $D^+$, $T^+$, $D^+$—$T^+$ mixture, or the like. However, as the plasma density builds up the energy of the ions delivered by source 12 may be raised and conditions in the neutralizer and/or exciter modified to produce higher energy excited neutral particles, e.g., 20 to 100 KeV, which can now, in the presence of the initiator plasma, be effectively ionized and trapped to further build up the plasma density as well as elevate the plasma temperature to approach or attain thermonuclear reaction conditions in the reactor. Alternatively, separate high energy neutral particle sources of conventional type may be used in combination with the low energy excited neutral particle sources provided as described above.

While there has been described in the foregoing what may be considered to be preferred embodiments of the invention, modification may be made therein within the spirit and scope of the invention and it is intended to cover all such as fall within the scope of the appended claims.

What we claim is:

1. In a process for producing a beam of excited state energetic neutral particles, the steps comprising:
    generating a collimated beam of ions comprising a material selected from the group consisting of $H^+$, $D^+$ and $T^+$, said ions having an energy of below about 10 KeV; and
    directing said beam of ions through a region containing a gaseous medium selected from the group consisting of $H_2$, $N_2$, $C_8F_{16}$ and $H_2O$, said gaseous medium presenting a target thickness in the range of about 80 micron-cm to about 500 micron-cm wherein said ions undergo multiple collisions with the particles of said gaseous medium and are converted into neutral particles in an excited quantum state and wherefrom said beam emerges from said region as said beam of excited state neutral particles.

2. A process as defined in claim 1 wherein said ions of said collimated beam have an energy in the range of about 0.8 KeV to about 8 KeV.

3. In a process for producing a beam of excited state energetic neutral particles, the steps comprising:
    generating a collimated beam of ions comprising a material selected from the group consisting of $H^+$, $D^+$ and $T^+$, said ions having an energy of below about 10 KeV;
    directing said collimated beam of ions through a first region containing a gaseous medium operated under resonance charge exchange conditions wherein the ions undergo charge exchange neutralization to emerge as a neutral particle beam; and
    then directing said neutral particle beam through a region containing a second gaseous medium selected from the group consisting of $H_2O$, $H_2$, $NH_3$, $N_2$ and $C_8F_{16}$, said second gaseous medium presenting a target thickness in the range of about 30 micron-cm to about 100 micron-cm.

4. A process as defined in claim 3 wherein said gaseous medium operated under resonance charge exchange conditions is a material selected from the group consisting of hydrogen and magnesium under conditions presenting a target thickness in the range of about 50 micron-cm to about 150 micron-cm.

* * * * *